Aug. 20, 1929.  J. E. SHEPHERD  1,725,483
BRAKE
Filed April 13, 1927
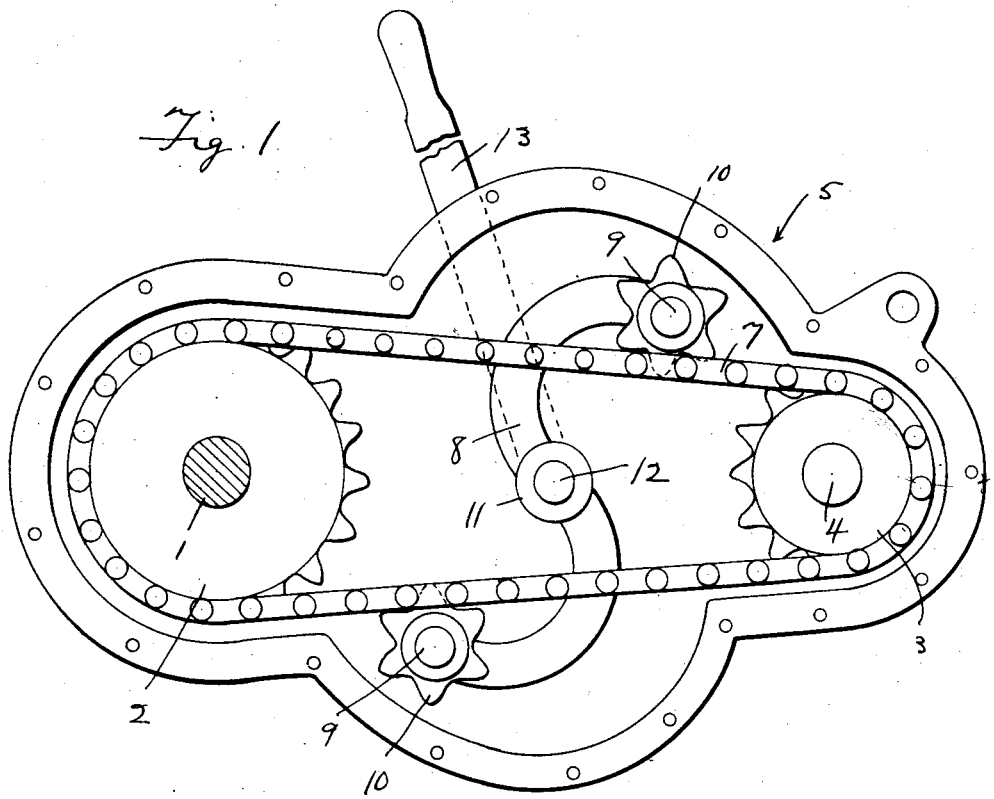
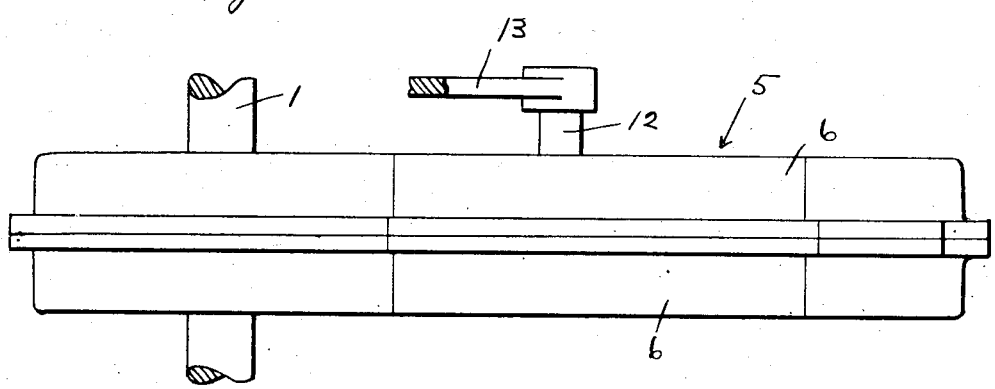
Inventor
Joseph E. Shepherd
By Clarence A. O'Brien
Attorney Patented Aug. 20, 1929.

1,725,483

UNITED STATES PATENT OFFICE.

JOSEPH E. SHEPHERD, OF WAUKEGAN, ILLINOIS.

BRAKE.

Application filed April 13, 1927. Serial No. 183,519.

The present invention relates to an improved brake capable of general use, but adapted more particularly for use upon an automobile wheel axle.

Briefly, the invention comprises main and supplemental sprocket wheels located in a casing, the main sprocket wheel being keyed or fixedly mounted on the axle and the supplementary sprocket being mounted for idling in the casing. A roller chain is trained over these sprockets. A novel chain contracting device is mounted for movement in the casing for cooperation with the intermediate portions of the chain flights for producing the braking action.

My principal aim is to generally improve upon brake structures by providing one embodying a novel arrangement of parts arranged in a manner to provide a structure of surpassing merit, one which is practical and efficient in operation and use.

Another object is to produce a structure which is characterized by simplicity, compactness and convenience of arrangement of parts, expeditious assembly, and indispensable and exclusive features.

The construction and arrangement of each part as well as the alleged novelty is based upon the new organization and will become more readily apparent from the following description and drawings:

In the drawings:

Figure 1 is a side view with the cover plate or top section of the casing removed to disclose the internal construction and arrangement.

Figure 2 is a top plan view of the structure enclosed in the casing.

In the drawings, the reference character 1 designates an axle or shaft, upon which the main sprocket wheel 2 is fixedly mounted. Located in alignment with and in forwardly spaced relation from the sprocket 2 is a comparatively small supplementary sprocket wheel 3. This is provided with journals 4 mounted for free rotation in appropriate bearings in the casing 5. Incidentally the casing is preferably made of duplicate half sections of appropriate configuration bolted or otherwise detachably secured together, the sections being designated by the reference character 6. As before indicated, the small sprocket 3 constitutes an idler. A roller chain 7 of appropriate construction is trained over the sprockets 2 and 3 in the manner shown.

The means for producing the braking action comprises a substantially S-shaped lever 8 located within the casing and provided at its opposite ends with outstanding journals 9, upon which small star wheels 10 are rotatably mounted. The teeth of the star wheels are located for engagement with the rollers on the chain. Normally the star wheels rotate freely with the chain and do not affect the free movement thereof or the free movement of the sprocket wheel. This lever 8 is provided at its center with a hub 11, which is fixedly mounted on a rock shaft 12, mounted in bearings in the casing sections. The rock shaft extends beyond one side of the casing as shown in Figure 2—and an operating lever 13 is connected therewith.

It will be noted that the lever 13 extends in a direction inclined toward the rear axle 1. Consequently when the lever is moved in a forward direction, the rock shaft 12 is oscillated to bring the S-shaped actuating lever 8 in place. Movement of this lever 8 serves to bind the star wheels 10 against the upper and lower flights of the roller chain, thus moving the flights toward each other, contracting the chains sufficiently to produce the braking action on the sprocket wheels 2, 3. The direct braking action is caused by increased friction between the shafts 1 and 4 and their bearings, due to the contracting of the chain under the action of the S-shaped lever.

It is obvious from the foregoing description and drawings that I have evolved and produced an exceptionally novel arrangement of parts which intimately cooperate in producing a smooth operating and positive brake. The parts are readily accessible within the casing, are adapted to run in oil to expedite movement of the parts, and are otherwise advantageous as will be apparent to persons skilled in the art to which the invention relates. In view of this, a more lengthy description is believed to be unnecessary.

While the preferred embodiment of the invention has been shown and described, it is to be understood that minor changes coming within the field of invention claimed may be resorted to, if desired.

I claim:

1. In a brake structure of the class described, a casing, an axle mounted for rotation at one end of the casing, a main sprocket wheel fixedly mounted upon said axle and located in said casing, supplemental sprocket mounted in an opposite end portion of the casing and mounted for idling, a roller chain trained over the peripheral portions of said sprockets, a rock shaft located in the central portion of the casing between the upper and lower flights of said chain, an operating lever for said rock shaft, and a contracting lever located within said casing fixedly mounted on said rock shaft and provided with the elements at its opposite ends in engagement with the flights of said chain for binding the latter around said sprockets to produce a braking action on said axle.

2. In a structure of the class described, a casing, an axle mounted for rotation in one end portion of the casing, a main sprocket wheel fixedly mounted upon said axle and located in said casing, a brake supplementary sprocket located in the opposite end portion of the casing for idling, a roller chain trained over the peripheral portions of said sprockets, a rock shaft journaled for oscillation in the intermediate portion of the casing between the upper and lower flights of said chain, operating lever for said rock shaft, a substantially S-shaped lever located within said casing, and fixedly mounted upon said rock shaft and having its end portions extending outwardly beyond and terminating in close proximity to said chain flights, and star wheels mounted on the end portions of said S-shaped lever and in engagement with said chain flight.

In testimony whereof I affix my signature.

JOSEPH E. SHEPHERD.